United States Patent
Sposetti et al.

(10) Patent No.: US 8,463,852 B2
(45) Date of Patent: Jun. 11, 2013

(54) GROUPWARE PORTLETS FOR INTEGRATING A PORTAL WITH GROUPWARE SYSTEMS

(75) Inventors: Jeffrey Thomas Sposetti, Superior, CO (US); Lev Greysman, King of Prussia, PA (US)

(73) Assignee: Oracle International Corporation, Redwood Shores, CA (US)

(*) Notice: Subject to any disclaimer, the term of this patent is extended or adjusted under 35 U.S.C. 154(b) by 1209 days.

(21) Appl. No.: 11/539,492

(22) Filed: Oct. 6, 2006

(65) Prior Publication Data

US 2008/0086527 A1 Apr. 10, 2008

(51) Int. Cl.
*G06F 15/16* (2006.01)
*G06F 15/173* (2006.01)

(52) U.S. Cl.
USPC ............ 709/204; 709/205; 709/224; 709/227

(58) Field of Classification Search
USPC .......................................................... 709/204
See application file for complete search history.

(56) References Cited

U.S. PATENT DOCUMENTS

| | | | |
|---|---|---|---|
| 5,237,614 A | 8/1993 | Weiss | |
| 5,335,345 A | 8/1994 | Frieder et al. | |
| 5,341,478 A | 8/1994 | Travis, Jr. et al. | |
| 5,347,653 A | 9/1994 | Flynn et al. | |
| 5,355,474 A | 10/1994 | Thuraisngham et al. | |
| 5,369,702 A | 11/1994 | Shanton | |
| 5,426,747 A | 6/1995 | Weinreb et al. | |
| 5,544,322 A | 8/1996 | Cheng et al. | |
| 5,557,747 A | 9/1996 | Rogers et al. | |
| 5,619,710 A | 4/1997 | Travis, Jr. et al. | |
| 5,627,886 A | 5/1997 | Bowman | |
| 5,671,360 A | 9/1997 | Hambrick et al. | |
| 5,757,669 A | 5/1998 | Christie et al. | |
| 5,806,066 A | 9/1998 | Golshani et al. | |

(Continued)

FOREIGN PATENT DOCUMENTS

| EP | 697662 | 2/1996 |
|---|---|---|
| EP | 1 256 889 | 11/2002 |

(Continued)

OTHER PUBLICATIONS

An Introduction to BEA WebLogic® Server Security: The New Security Architecture of BEA WebLogic Server™ 7.0, BEA White Paper, May 1, 2002, 20 pages.

(Continued)

*Primary Examiner* — Richard G Keehn
(74) *Attorney, Agent, or Firm* — Fliesler Meyer LLP

(57) ABSTRACT

A set of groupware portlets can be deployed on an enterprise portal in order to add groupware functionality thereon. The groupware portlets can provide an abstract user interface to groupware functionality provided by several collaboration servers and can also allow users to navigate to specific groupware functionality provided by a collaboration server. The portlets can connect to the various collaboration servers by implementing a personal messaging application programming interface. The interface can include a schema for defining groupware functionality and a set of providers for instantiating the connections to the various collaboration servers. The providers can be implementations of the schema that allow the groupware portlets to interact with the collaboration server. New schemas can be defined to extend existing schemas to enable more specific functionality provided by each collaboration server. The new schemas can be supported by the providers due to Java class inheritance.

18 Claims, 8 Drawing Sheets

U.S. PATENT DOCUMENTS

| | | | |
|---|---|---|---|
| 5,825,883 A | 10/1998 | Archibald et al. | |
| 5,826,000 A | 10/1998 | Hamilton | |
| 5,848,396 A | 12/1998 | Gerace | |
| 5,867,667 A | 2/1999 | Butman et al. | |
| 5,872,928 A | 2/1999 | Lewis et al. | |
| 5,873,088 A | 2/1999 | Hayashi et al. | |
| 5,889,953 A | 3/1999 | Thebaut et al. | |
| 5,911,143 A | 6/1999 | Deinhart et al. | |
| 5,913,061 A * | 6/1999 | Gupta et al. | 719/310 |
| 5,918,210 A | 6/1999 | Rosenthal et al. | |
| 5,925,136 A | 7/1999 | Watts | |
| 5,941,947 A | 8/1999 | Brown et al. | |
| 5,950,195 A | 9/1999 | Stockwell et al. | |
| 5,954,798 A | 9/1999 | Shelton et al. | |
| 5,956,400 A | 9/1999 | Chaum et al. | |
| 5,966,707 A | 10/1999 | Van Huben et al. | |
| 5,987,469 A | 11/1999 | Lewis et al. | |
| 5,987,611 A | 11/1999 | Freund | |
| 6,006,194 A | 12/1999 | Merel | |
| 6,014,666 A | 1/2000 | Hellend et al. | |
| 6,023,765 A | 2/2000 | Kuhn | |
| 6,029,144 A | 2/2000 | Barrett et al. | |
| 6,029,182 A | 2/2000 | Nehab et al. | |
| 6,029,196 A | 2/2000 | Lenz | |
| 6,054,910 A | 4/2000 | Tada et al. | |
| 6,055,515 A | 4/2000 | Consentino et al. | |
| 6,073,242 A | 6/2000 | Hardy et al. | |
| 6,083,276 A | 7/2000 | Davidson et al. | |
| 6,088,679 A | 7/2000 | Barkley | |
| 6,098,173 A | 8/2000 | Elgressy et al. | |
| 6,108,687 A | 8/2000 | Craig | |
| 6,122,647 A | 9/2000 | Horowitz et al. | |
| 6,141,010 A | 10/2000 | Hoyle | |
| 6,141,686 A | 10/2000 | Jackowski et al. | |
| 6,148,333 A | 11/2000 | Guedalia et al. | |
| 6,154,844 A | 11/2000 | Touboul et al. | |
| 6,157,924 A | 12/2000 | Austin | |
| 6,158,010 A | 12/2000 | Moriconi et al. | |
| 6,161,139 A | 12/2000 | Win et al. | |
| 6,167,407 A | 12/2000 | Nachenberg et al. | |
| 6,167,445 A | 12/2000 | Gai et al. | |
| 6,167,448 A | 12/2000 | Hemphill et al. | |
| 6,169,794 B1 | 1/2001 | Oshimi et al. | |
| 6,170,009 B1 | 1/2001 | Mandal et al. | |
| 6,178,172 B1 | 1/2001 | Rochberger | |
| 6,182,142 B1 | 1/2001 | Win et al. | |
| 6,182,226 B1 | 1/2001 | Reid et al. | |
| 6,182,277 B1 | 1/2001 | Degroot et al. | |
| 6,185,587 B1 | 2/2001 | Bernardo et al. | |
| 6,188,399 B1 | 2/2001 | Voas et al. | |
| 6,192,419 B1 | 2/2001 | Aditham et al. | |
| 6,195,696 B1 | 2/2001 | Baber et al. | |
| 6,202,066 B1 | 3/2001 | Barkley et al. | |
| 6,202,157 B1 | 3/2001 | Brownlie et al. | |
| 6,202,207 B1 | 3/2001 | Donohue | |
| 6,205,466 B1 | 3/2001 | Karp et al. | |
| 6,209,101 B1 | 3/2001 | Mitchem et al. | |
| 6,216,134 B1 | 4/2001 | Heckerman et al. | |
| 6,216,231 B1 | 4/2001 | Stubblebine | |
| 6,226,745 B1 | 5/2001 | Wiederhold | |
| 6,233,576 B1 | 5/2001 | Lewis | |
| 6,236,991 B1 | 5/2001 | Frauenhofer et al. | |
| 6,241,608 B1 | 6/2001 | Torango | |
| 6,243,747 B1 | 6/2001 | Lewis et al. | |
| 6,253,321 B1 | 6/2001 | Nikander et al. | |
| 6,256,741 B1 | 7/2001 | Stubblebine | |
| 6,260,050 B1 | 7/2001 | Yost et al. | |
| 6,269,393 B1 | 7/2001 | Yost et al. | |
| 6,269,456 B1 | 7/2001 | Hodges et al. | |
| 6,275,941 B1 | 8/2001 | Saito et al. | |
| 6,278,452 B1 | 8/2001 | Huberman et al. | |
| 6,285,366 B1 | 9/2001 | Ng et al. | |
| 6,285,983 B1 | 9/2001 | Jenkins | |
| 6,285,985 B1 | 9/2001 | Horstmann | |
| 6,292,900 B1 | 9/2001 | Ngo et al. | |
| 6,295,607 B1 | 9/2001 | Johnson | |
| 6,301,613 B1 | 10/2001 | Ahlstrom et al. | |
| 6,304,881 B1 | 10/2001 | Halim et al. | |
| 6,308,163 B1 | 10/2001 | Du et al. | |
| 6,317,868 B1 | 11/2001 | Grimm et al. | |
| 6,321,336 B1 | 11/2001 | Applegate et al. | |
| 6,327,594 B1 | 12/2001 | Van Huben et al. | |
| 6,327,618 B1 | 12/2001 | Ahlstrom et al. | |
| 6,327,628 B1 | 12/2001 | Anuff | |
| 6,336,073 B1 | 1/2002 | Ihara et al. | |
| 6,339,423 B1 | 1/2002 | Sampson et al. | |
| 6,339,826 B2 | 1/2002 | Hayes, Jr. et al. | |
| 6,341,352 B1 | 1/2002 | Child et al. | |
| 6,349,297 B1 | 2/2002 | Shaw et al. | |
| 6,353,886 B1 | 3/2002 | Howard et al. | |
| 6,357,010 B1 | 3/2002 | Viets | |
| 6,360,230 B1 | 3/2002 | Chan et al. | |
| 6,360,363 B1 | 3/2002 | Moser et al. | |
| 6,366,915 B1 | 4/2002 | Rubert et al. | |
| 6,377,973 B2 | 4/2002 | Gideon | |
| 6,381,579 B1 | 4/2002 | Gervais et al. | |
| 6,385,627 B1 | 5/2002 | Cragun | |
| 6,393,474 B1 | 5/2002 | Eichert et al. | |
| 6,397,222 B1 | 5/2002 | Zellweger | |
| 6,397,231 B1 | 5/2002 | Salisbury et al. | |
| 6,412,070 B1 | 6/2002 | Van Dyke et al. | |
| 6,412,077 B1 | 6/2002 | Roden et al. | |
| 6,418,448 B1 | 7/2002 | Sarkar | |
| 6,430,556 B1 | 8/2002 | Goldberg et al. | |
| 6,434,607 B1 | 8/2002 | Haverstock et al. | |
| 6,438,563 B1 | 8/2002 | Kawagoe | |
| 6,449,638 B1 | 9/2002 | Wecker et al. | |
| 6,457,007 B1 | 9/2002 | Kikuchi et al. | |
| 6,460,084 B1 | 10/2002 | Van Horne et al. | |
| 6,460,141 B1 | 10/2002 | Olden | |
| 6,463,440 B1 | 10/2002 | Hind et al. | |
| 6,466,239 B2 | 10/2002 | Ishikawa | |
| 6,466,932 B1 | 10/2002 | Dennis et al. | |
| 6,473,791 B1 | 10/2002 | Al-Ghosein et al. | |
| 6,477,543 B1 | 11/2002 | Huang et al. | |
| 6,477,575 B1 | 11/2002 | Koeppel et al. | |
| 6,484,177 B1 | 11/2002 | Van Huben et al. | |
| 6,484,261 B1 | 11/2002 | Wiegel | |
| 6,487,594 B1 | 11/2002 | Bahlmann | |
| 6,510,513 B1 | 1/2003 | Danieli | |
| 6,516,349 B1 | 2/2003 | Lieberman | |
| 6,519,647 B1 | 2/2003 | Howard et al. | |
| 6,530,024 B1 | 3/2003 | Proctor | |
| 6,539,375 B2 | 3/2003 | Kawasaki | |
| 6,542,993 B1 | 4/2003 | Erfani | |
| 6,571,247 B1 | 5/2003 | Danno et al. | |
| 6,574,736 B1 | 6/2003 | Andrews | |
| 6,581,054 B1 | 6/2003 | Bogrett | |
| 6,581,071 B1 | 6/2003 | Gustman et al. | |
| 6,584,454 B1 | 6/2003 | Hummel, Jr. et al. | |
| 6,587,849 B1 | 7/2003 | Mason et al. | |
| 6,587,876 B1 | 7/2003 | Mahon et al. | |
| 6,615,218 B2 | 9/2003 | Mandal et al. | |
| 6,618,806 B1 | 9/2003 | Brown et al. | |
| 6,633,538 B1 | 10/2003 | Tanaka et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | |
| 6,671,689 B2 | 12/2003 | Papierniak | |
| 6,684,369 B1 | 1/2004 | Bernardo et al. | |
| 6,694,306 B1 | 2/2004 | Nishizawa | |
| 6,697,805 B1 | 2/2004 | Choquier et al. | |
| 6,715,077 B1 | 3/2004 | Vasudevan et al. | |
| 6,721,888 B1 | 4/2004 | Liu et al. | |
| 6,728,713 B1 | 4/2004 | Beach et al. | |
| 6,732,144 B1 | 5/2004 | Kizu et al. | |
| 6,735,586 B2 | 5/2004 | Timmons | |
| 6,735,624 B1 | 5/2004 | Rubin et al. | |
| 6,735,701 B1 | 5/2004 | Jacobson | |
| 6,738,789 B2 | 5/2004 | Multer | |
| 6,745,207 B2 | 6/2004 | Reuter et al. | |
| 6,751,657 B1 | 6/2004 | Zothner | |
| 6,751,659 B1 | 6/2004 | Fenger et al. | |
| 6,754,672 B1 | 6/2004 | McLauchlin | |
| 6,757,698 B2 | 6/2004 | McBride et al. | |
| 6,757,822 B1 | 6/2004 | Feiertag et al. | |
| 6,769,095 B1 | 7/2004 | Brassard et al. | |

| | | | | | | |
|---|---|---|---|---|---|---|
| 6,769,118 B2 | 7/2004 | Garrison et al. | 7,426,721 B1 * | 9/2008 | Saulpaugh et al. | 717/144 |
| 6,772,157 B2 | 8/2004 | Barnett et al. | 7,484,202 B2 | 1/2009 | Cheng et al. | |
| 6,772,332 B1 | 8/2004 | Boebert et al. | 2001/0009016 A1 | 7/2001 | Hofmann et al. | |
| 6,779,002 B1 | 8/2004 | Mwaura | 2001/0032128 A1 | 10/2001 | Kepecs | |
| 6,789,202 B1 | 9/2004 | Ko et al. | 2001/0034771 A1 | 10/2001 | Hutsch et al. | |
| 6,792,537 B1 | 9/2004 | Liu et al. | 2001/0034774 A1 | 10/2001 | Watanabe et al. | |
| 6,832,313 B1 | 12/2004 | Parker | 2001/0039586 A1 | 11/2001 | Primak et al. | |
| 6,834,284 B2 | 12/2004 | Acker et al. | 2001/0044810 A1 | 11/2001 | Timmons | |
| 6,853,997 B2 | 2/2005 | Wotring et al. | 2001/0047485 A1 | 11/2001 | Brown et al. | |
| 6,854,035 B2 | 2/2005 | Dunham et al. | 2002/0005867 A1 | 1/2002 | Gvily | |
| 6,856,999 B2 | 2/2005 | Flanagin et al. | 2002/0010741 A1 | 1/2002 | Stewart | |
| 6,857,012 B2 | 2/2005 | Sim et al. | 2002/0019827 A1 | 2/2002 | Shiman et al. | |
| 6,865,549 B1 | 3/2005 | Connor | 2002/0023122 A1 | 2/2002 | Polizzi et al. | |
| 6,873,988 B2 | 3/2005 | Herrmann et al. | 2002/0029296 A1 | 3/2002 | Anuff et al. | |
| 6,880,005 B1 | 4/2005 | Bell et al. | 2002/0046099 A1 | 4/2002 | Frengut et al. | |
| 6,886,100 B2 | 4/2005 | Harrah et al. | 2002/0059394 A1 | 5/2002 | Sanders | |
| 6,889,222 B1 | 5/2005 | Zhao | 2002/0062451 A1 | 5/2002 | Scheidt et al. | |
| 6,901,403 B1 | 5/2005 | Bata et al. | 2002/0067370 A1 | 6/2002 | Forney et al. | |
| 6,904,454 B2 | 6/2005 | Stickler | 2002/0069261 A1 | 6/2002 | Bellare et al. | |
| 6,912,538 B2 | 6/2005 | Stapel et al. | 2002/0087571 A1 | 7/2002 | Stapel et al. | |
| 6,917,975 B2 | 7/2005 | Griffin et al. | 2002/0103818 A1 | 8/2002 | Amberden | |
| 6,918,088 B2 | 7/2005 | Clark et al. | 2002/0104071 A1 | 8/2002 | Charisius et al. | |
| 6,920,457 B2 | 7/2005 | Pressmar | 2002/0107913 A1 | 8/2002 | Rivera et al. | |
| 6,922,695 B2 | 7/2005 | Skufca | 2002/0107920 A1 | 8/2002 | Hotti | |
| 6,925,487 B2 | 8/2005 | Kim | 2002/0111998 A1 | 8/2002 | Kim | |
| 6,931,549 B1 | 8/2005 | Ananda | 2002/0112171 A1 | 8/2002 | Ginter et al. | |
| 6,934,532 B2 | 8/2005 | Coppinger et al. | 2002/0120685 A1 | 8/2002 | Srivastava et al. | |
| 6,934,934 B1 | 8/2005 | Osborne | 2002/0124053 A1 | 9/2002 | Adams et al. | |
| 6,947,989 B2 | 9/2005 | Gullotta et al. | 2002/0135617 A1 | 9/2002 | Samid | |
| 6,950,825 B2 | 9/2005 | Chang et al. | 2002/0143819 A1 | 10/2002 | Han et al. | |
| 6,957,261 B2 | 10/2005 | Lortz | 2002/0147645 A1 | 10/2002 | Alao et al. | |
| 6,961,897 B1 | 11/2005 | Peel et al. | 2002/0147696 A1 | 10/2002 | Acker | |
| 6,965,999 B2 | 11/2005 | Fox et al. | 2002/0147801 A1 | 10/2002 | Gullotta et al. | |
| 6,970,445 B2 | 11/2005 | O'Neill et al. | 2002/0152267 A1 | 10/2002 | Lennon | |
| 6,970,840 B1 | 11/2005 | Yu et al. | 2002/0152279 A1 | 10/2002 | Sollenberger et al. | |
| 6,970,876 B2 | 11/2005 | Hotti et al. | 2002/0161903 A1 | 10/2002 | Besaw | |
| 6,978,379 B1 | 12/2005 | Goh et al. | 2002/0169893 A1 | 11/2002 | Chen et al. | |
| 6,985,915 B2 | 1/2006 | Somalwar et al. | 2002/0169975 A1 | 11/2002 | Good | |
| 6,987,580 B2 | 1/2006 | Watanabe et al. | 2002/0173971 A1 | 11/2002 | Stirpe et al. | |
| 6,988,138 B1 | 1/2006 | Alcorn et al. | 2002/0178119 A1 | 11/2002 | Griffin et al. | |
| 7,003,578 B2 | 2/2006 | Kanada et al. | 2002/0188869 A1 | 12/2002 | Patrick | |
| 7,013,485 B2 | 3/2006 | Brown et al. | 2002/0194267 A1 | 12/2002 | Flesner et al. | |
| 7,035,857 B2 | 4/2006 | Reeves et al. | 2003/0014442 A1 | 1/2003 | Shiigi et al. | |
| 7,035,879 B2 | 4/2006 | Shi et al. | 2003/0032409 A1 | 2/2003 | Hutcheson et al. | |
| 7,035,944 B2 | 4/2006 | Fletcher et al. | 2003/0033315 A1 | 2/2003 | Winkler | |
| 7,043,472 B2 | 5/2006 | Aridor et al. | 2003/0046576 A1 | 3/2003 | High, Jr. et al. | |
| 7,043,685 B2 | 5/2006 | Azuma | 2003/0065721 A1 | 4/2003 | Roskind | |
| 7,047,522 B1 | 5/2006 | Dixon et al. | 2003/0069874 A1 | 4/2003 | Hertzog | |
| 7,051,016 B2 | 5/2006 | Winkler | 2003/0078959 A1 | 4/2003 | Yeung et al. | |
| 7,051,071 B2 | 5/2006 | Stewart | 2003/0078972 A1 | 4/2003 | Tapissier et al. | |
| 7,051,316 B2 | 5/2006 | Charisius et al. | 2003/0088617 A1 | 5/2003 | Clark et al. | |
| 7,054,910 B1 | 5/2006 | Nordin et al. | 2003/0110448 A1 | 6/2003 | Haut et al. | |
| 7,062,490 B2 | 6/2006 | Adya et al. | 2003/0115484 A1 | 6/2003 | Moriconi et al. | |
| 7,062,511 B1 | 6/2006 | Poulsen | 2003/0120686 A1 | 6/2003 | Kim et al. | |
| 7,076,652 B2 | 7/2006 | Ginter et al. | 2003/0126236 A1 | 7/2003 | Marl et al. | |
| 7,080,000 B1 | 7/2006 | Cambridge | 2003/0126464 A1 | 7/2003 | McDaniel et al. | |
| 7,085,755 B2 | 8/2006 | Bluhm et al. | 2003/0126558 A1 | 7/2003 | Griffin | |
| 7,085,994 B2 | 8/2006 | Gvily | 2003/0131113 A1 | 7/2003 | Reeves et al. | |
| 7,089,584 B1 | 8/2006 | Sharma | 2003/0135490 A1 | 7/2003 | Barrett et al. | |
| 7,093,200 B2 | 8/2006 | Schreiber et al. | 2003/0140308 A1 | 7/2003 | Murthy et al. | |
| 7,093,261 B1 | 8/2006 | Harper et al. | 2003/0145275 A1 | 7/2003 | Qian et al. | |
| 7,093,283 B1 | 8/2006 | Chen et al. | 2003/0146937 A1 | 8/2003 | Lee | |
| 7,096,224 B2 | 8/2006 | Murthy et al. | 2003/0167315 A1 | 9/2003 | Chowdhry et al. | |
| 7,111,321 B1 | 9/2006 | Watts et al. | 2003/0167455 A1 | 9/2003 | Iborra et al. | |
| 7,124,192 B2 | 10/2006 | High et al. | 2003/0182577 A1 | 9/2003 | Mocek | |
| 7,124,413 B1 | 10/2006 | Klemm et al. | 2003/0187956 A1 | 10/2003 | Belt et al. | |
| 7,134,076 B2 | 11/2006 | Bahrs et al. | 2003/0188085 A1 | 10/2003 | Arakawa et al. | |
| 7,146,564 B2 | 12/2006 | Kim et al. | 2003/0200350 A1 | 10/2003 | Kumar et al. | |
| 7,174,563 B1 | 2/2007 | Brownlie et al. | 2003/0204481 A1 | 10/2003 | Lau | |
| 7,185,192 B1 | 2/2007 | Khan | 2003/0212766 A1 | 11/2003 | Giles et al. | |
| 7,219,140 B2 | 5/2007 | Marl et al. | 2003/0216938 A1 | 11/2003 | Shour | |
| 7,240,076 B2 | 7/2007 | McCauley et al. | 2003/0220913 A1 | 11/2003 | Doganata et al. | |
| 7,257,818 B2 | 8/2007 | Foerg et al. | 2003/0220963 A1 | 11/2003 | Golovinsky et al. | |
| 7,269,664 B2 | 9/2007 | Hutsch et al. | 2003/0229501 A1 | 12/2003 | Copeland et al. | |
| 7,272,625 B1 | 9/2007 | Hannel et al. | 2003/0229623 A1 | 12/2003 | Chang et al. | |
| 7,284,010 B2 * | 10/2007 | Rajan et al. ............ 707/102 | 2004/0003071 A1 | 1/2004 | Mathew et al. | |
| 7,330,537 B2 | 2/2008 | Frifeldt et al. | 2004/0010719 A1 | 1/2004 | Daenen | |
| 7,343,428 B2 | 3/2008 | Fletcher et al. | 2004/0019650 A1 | 1/2004 | Auvenshire | |
| 7,383,302 B2 | 6/2008 | Cohen et al. | 2004/0024812 A1 | 2/2004 | Park et al. | |

| | | | |
|---|---|---|---|
| 2004/0030744 | A1 | 2/2004 | Rubin et al. |
| 2004/0030795 | A1 | 2/2004 | Hesmer et al. |
| 2004/0064633 | A1 | 4/2004 | Oota |
| 2004/0078371 | A1 | 4/2004 | Worrall et al. |
| 2004/0093344 | A1 | 5/2004 | Berger |
| 2004/0098467 | A1 | 5/2004 | Dewey et al. |
| 2004/0098470 | A1 | 5/2004 | Kurihara |
| 2004/0098606 | A1 | 5/2004 | Tan et al. |
| 2004/0107256 | A1* | 6/2004 | Odenwald et al. ............ 709/205 |
| 2004/0107360 | A1 | 6/2004 | Herrmann et al. |
| 2004/0125144 | A1 | 7/2004 | Yoon |
| 2004/0162733 | A1 | 8/2004 | Griffin |
| 2004/0162905 | A1 | 8/2004 | Griffin |
| 2004/0162906 | A1 | 8/2004 | Griffin |
| 2004/0167880 | A1 | 8/2004 | Smith |
| 2004/0167899 | A1 | 8/2004 | Patadia et al. |
| 2004/0205473 | A1 | 10/2004 | Fisher et al. |
| 2004/0205557 | A1 | 10/2004 | Bahrs et al. |
| 2004/0215635 | A1 | 10/2004 | Chang et al. |
| 2004/0215650 | A1 | 10/2004 | Shaji et al. |
| 2004/0230546 | A1 | 11/2004 | Rogers |
| 2004/0236760 | A1 | 11/2004 | Arkeketa et al. |
| 2004/0243824 | A1 | 12/2004 | Jones |
| 2005/0021502 | A1 | 1/2005 | Chen et al. |
| 2005/0021656 | A1 | 1/2005 | Callegari |
| 2005/0050184 | A1 | 3/2005 | Boden et al. |
| 2005/0060324 | A1 | 3/2005 | Johnson et al. |
| 2005/0086206 | A1 | 4/2005 | Balasubramanian et al. |
| 2005/0086469 | A1 | 4/2005 | Dunagan et al. |
| 2005/0097008 | A1 | 5/2005 | Ehring et al. |
| 2005/0149342 | A1* | 7/2005 | Chao et al. ........................ 705/1 |
| 2005/0198617 | A1 | 9/2005 | Kim et al. |
| 2005/0256894 | A1 | 11/2005 | Talanis et al. |
| 2005/0257267 | A1 | 11/2005 | Williams et al. |
| 2005/0289160 | A1* | 12/2005 | Ashwin et al. ................ 707/100 |
| 2006/0005150 | A1 | 1/2006 | Pankovcin |
| 2006/0026193 | A1* | 2/2006 | Hood ............................ 707/102 |
| 2006/0059107 | A1 | 3/2006 | Elmore et al. |
| 2006/0085412 | A1 | 4/2006 | Johnson et al. |
| 2006/0089990 | A1* | 4/2006 | Ng et al. ...................... 709/227 |
| 2006/0122882 | A1 | 6/2006 | Brown et al. |
| 2006/0167858 | A1 | 7/2006 | Dennis et al. |
| 2006/0177023 | A1* | 8/2006 | Vaghar et al. .............. 379/88.17 |
| 2006/0184473 | A1* | 8/2006 | Eder .............................. 706/20 |
| 2006/0225123 | A1 | 10/2006 | Childress et al. |
| 2006/0277594 | A1 | 12/2006 | Chiavegatto et al. |
| 2007/0083484 | A1 | 4/2007 | McVeigh et al. |
| 2007/0112851 | A1* | 5/2007 | Tomic et al. ................ 707/104.1 |
| 2007/0283020 | A1* | 12/2007 | Chowdary et al. ............ 709/227 |
| 2007/0294743 | A1 | 12/2007 | Kaler et al. |
| 2008/0016014 | A1* | 1/2008 | Sigal et al. ...................... 706/15 |
| 2008/0021912 | A1* | 1/2008 | Seligman et al. ............. 707/101 |

FOREIGN PATENT DOCUMENTS

| | | |
|---|---|---|
| WO | 00/38078 | 6/2000 |
| WO | 01/14962 | 3/2001 |
| WO | 01/67285 | 9/2001 |
| WO | 01/77823 | 10/2001 |
| WO | 02/063496 | 8/2002 |
| WO | 02/075597 | 9/2002 |

OTHER PUBLICATIONS

"Combined-User Interface for Computers, Television, Video Recorders, and Telephone, etc..," IBM Technical Disclosure Bulletin, US, pp. 116-118 (Aug. 1990).

"Guide to Using the BEA E-Business Control Center," BEA Web Logic Portal, Version 4.0 (Oct. 2001) 356 pages.

"Method and System for Visually Constructing Document Type Definitions and Related Artifacts Using a Reusable Object Model," IBM Technical Disclosures Bulletin, May 31, 2001, 3 pages.

Adomavicius, Gediminas, et al., "User Profiling in Personalization Applications Through Rule Discovery and Validation," KDD '99, San Diego, CA, US, ACM, pp. 377-381(1999).

Adya, Atul, et al., "FARSITE: Federated, Available, and Reliable Storage for an Incompletely Trusted Environment," ACM SIGOPS Operating Systems Review, vol. 36, Issue SI (Winter 2002), OSDI '02, Proceedings of the 5th Symposium on Operating Systems Design and Implementation, pp. 1-14.

Ahn, Gail-Joon, et al. Role-Based Authorization Constraints Specification Using Object Constraint Language, IEEE, pp. 157-162 (2001).

Atkins, David L., et al., "MAWL: A Domain Specific Language for Form-Based Services," IEEE Transactions on Software Engineering, IEEE Service Center, Los Alamitos, CA, US, vol. 25, No. 3, pp. 334-346 (May 1999).

Ayers, Danny et al., "Professional Java Server Programming," Wrox Press, Ltd., Birmingham, UK, Dec. 1999, pp. 515-545.

Baltimore SelectAccess™ next generation authorization management, www.baltimore.com, 8 pages (2001).

Barrett, Alexandra, "Trying Out Transactions", SunExpert Magazine, Jan. 1999, pp. 57-59.

BEA Systems, "WebLogic Server™ 6.1 has been released," The ServerSide.com, Sep. 13, 2001, 6 pages.

BEA WebLogic Portal-Development Guide, Release 7.0, Service Pack 1, Document Date Dec. 2002, 626 pages.

BEA WebLogic Server™, "Assembling and Configuring Web Applications," BEA Systems Release 7.0, Revised Aug. 20, 2002, 165 pages.

BEA WebLogic Server™, "Developing Security Providers for WebLogic Server," BEA Systems Release 7.0, Revised Aug. 30, 2002, 315 pages.

BEA WebLogic Server™, "Introduction to WebLogic Security," BEA Systems Release 7.0, Document Date Jun. 2002, Revised Jun. 28, 2002, 22 pages.

Bertino, Elisa, et al., "TRBAC: A Temporal Role-Based Access Control Model," ACM Transactions on Information and System Security (TISSEC), vol. 4, Issue 3, pp. 191-223 (Aug. 2001).

Browne, Shirley V., et al., Reuse Library Interoperability and the World Wide Web, ACM, pp. 182-189 (1997).

Browne, Shirley, et al. "Location-Independent Naming for virtual Distributed Software Repositories,"ACM Symposium on Software Reusability, Seattle, WA, US, vol. 20, Issue SI, pp. 179-185 (Aug. 1995).

Browne, Shirley, et al., "Technologies for Repository Interoperation and Access Control," ACM, pp. 40-48 (1995).

Candan, K.S., et al. "Enabling Dynamic Content Caching for Database-Driven Websites," Proceedings of the 2001 ACM SIGMOD International Conference on Management of Data, Santa Barbara, CA, US, pp. 532-543 (2001).

Catley, Christina, et al. "Design of a Health Care Architecture for Medical Data Interoperability and Application Integration," Proceedings of the Second Joint EMBS/BMES Conference, Houston, TX, US, Oct. 23-26, 2002, IEEE, vol. 3, pp. 1952-1953.

Cingil, Ibrahim, et al., "A Broader Approach to Personalization," Communications of the ACM, vol. 43, No. 6, pp. 136-141 (Aug. 2000).

Costello, S., "Baltimore to Release SelectAccess 5.0 with SAML," Apr. 24, 2002, www.infoworld.com/articles/hn/xml/02/02/24/020424hnsaml.html, printed Feb. 17, 2006.

Convington, Michael J., et al., "Securing Context-Aware Applications Using Environment Roles," ACM Workshop on Role Based Access Control, Proceedings of the Sixth ACM Symposium on Access Control Models and Technologies, pp. 10-20 (2001).

Faden, Glenn, "RBAC in UNIX Administration,"ACM Workshop on Role-Based Access Control, pp. 95-101 (1999).

First Data Chooses Baltimore SelectAccess to Secure Extranet Applications, Mar. 5, 2002, 2 pages.

Ford, Nigel, "Web Developer.com Guide to Building Intelligent Web Sites with JavaScript," Wiley Computer Publishing, New York, NY, 1998, pp. 65-86, 96-98, 245-250 and 324-327.

Freudenthal, Eric, et al., "dRBAC: Distributed Role-Based Access Control for Dynamic Coalition Environments," Proceedings of the 22nd International Conference on Distributed Computing Systems (ICDCS '02) IEEE 2002, 10 pages.

Georgiadis, Christos K., et al., "Flexible Team-Based Access Control Using Contexts," ACM Workshop on Role Based Access Control, Proceedings of the Sixth ACM Symposium on Access Control Methods and Technologies, pp. 21-27 (2001).

Goh, Cheh, et al., "Towards a more Complete Model of Role," Symposium on Access Control Models and Technologies, Proceedings of the Third ACM Workshop on Role-Based Access Control, pp. 55-61 (1998).

Gustafsson, Mats, et al., "Using NFS to Implement Role-Based Access Control," IEEE, pp. 299-304 (1997).

Hayton, R.J., et al., "Access Control in an Open Distributed Environment," 12 pages (1998).

Howes, T., "The String Representation of LDAP Search Filters," ©The Internet Society, RFC 2254, 8 pages (Dec. 1997).

http://java.sun.com/products/ejb/(last visit Dec. 7, 2004), 2 pages.

http://www.javaworld.com/jw-12-2002/jw-1207-yesnoejb_p.html (last visit: Dec. 7, 2004), 2 pages.

http://portal.acm.org/citation.cfm?id=1011436, 1 page, last visited: Oct. 24, 2007.

Hunter, Jason, "Java Servlet Programming," second edition, O'Reilly, Apr. 11, 2001, 20 pages.

International Search Report and Written Opinion for PCT/USO4/04079 dated Aug. 24, 2004, 6 pages.

International Search Report and Written Opinion for PCT/US04/04691 dated Sep. 24, 2004, 6 pages.

International Search Report for PCT/US02/34006, dated Jan. 13, 2003, 3 pages.

International Search Report for PCT/US02/34007, dated Jan. 21, 2003, 3 pages.

International Search Report for PCT/US02/34008, dated Dec. 31, 2002, 5 pages.

International Search Report for PCT/US02/34048, dated Dec. 23, 2002, 2 pages.

International Search Report for PCT/US02/34088, dated Mar. 7, 2003, 3 pages.

International Search Report for PCT/US02/34089, dated Feb. 19, 2003, 4 pages.

International Search Report for PCT/US02/34308, dated Mar. 5, 2003, 4 pages.

International Search Report for PCT/US02/34309, dated Feb. 14, 2003, 4 pages.

International Search Report for PCT/USO4/04078, dated Dec. 15, 2005, 2 pages.

International Search Report for PCT/US04/04140, dated Dec. 27, 2005, 2 pages.

IPER for PCT/US02/11969, dated Dec. 1, 2004, 2 pages.

Joshi, J., et al., "Security Models for Web-Based Applications," Communications of the ACM, vol. 44, No. 2, pp. 38-44 (2001).

Kistler, Thomas, et al., "WebL—a Programming Language for the Web," Computer Networks and ISDN Systems, North Holland Publishing, Amsterdam, NL, vol. 30, No. 1-7, pp. 259-270 (Apr. 1998).

Lee, Amy J., et al., "Keeping Virtual Information Resources up and Running," IBM Press, pp. 1-14 (Nov. 1997).

Levy, Michael R., "Web Programming in Guide," Software Practice & Experience, Wiley & Sons, Bognor Regis, GB, vol. 28, No. 15, Dec. 25, 1998, pp. 1581-1603.

Microsoft Computer Dictionary, 4th Edition, Microsoft Press, Redmond, WA, p. 404 (1999).

Microsoft Computer Dictionary, 5th Edition, Microsoft Press, Redmond, WA, pp. 115, 176 and 542 (2002).

Microsoft Windows ("Windows Explorer") copyright 1981-2001, 3 pages.

Moore, Bill et al., "Migrating Weblogic Applications to WebSphere Advanced Edition", IBM Redbooks, pp. 1, 3-4, 109-111 and 181-195 (Jan. 2001).

Moran et al., "Multimodal User Interfaces in the Open Agent Architecture", ACM 0-89791-839-8/96/01, IUI, Orlando, Florida USA (1997) pp. 61-68.

Na, Sang Yeob, et al., "Role Delegation in Role-Based Access Control," ACM Workshop on Role-Based Access Control, RBAC, Berlin, Germany, pp. 39-44 (2000).

Nuescheler, David, et al., "Java Content Repository-JSR-170," version 0.1, Apr. 24, 2002, version 0.2 May 10, 2004, version 0.3 May 17, 2002, version 0.4 Jul. 17, 2002, version 0.5 Sep. 16, 2002, and version 0.6 Nov. 26, 2002, pp. 1-99.

Oh, Sejong, et al., "Enterprise Model as a Basis of Administration on Role-Based Access Control," IEEE, pp. 150-158 (2001).

Okamoto, Eiji, "Proposal for Integrated Security Systems," IEEE Computer Society Press, pp. 354-358 (Jun. 1992).

Park, Joon S., "Role-Based Access Control on the Web," ACM Transactions on Information and System Security, vol. 4, No. 1, pp. 37-71(Feb. 2001).

Parker, Elisabeth, "The Complete Idiot's Guide® to Microsoft® FrontPage 2000", QUE®, Indianapolis, IN, pp. 7 and 52 (1999).

Porwal, Priyank, "Automating Optimistic Access Control Systems," 10 pages.

Povey, Dean, "Optimistic Security: A New Access Control Paradigm," 6 pages.

Rossi, Gustavo, et al., "Designing Personalized Web Applications," ACM, WWW 10, Hong Kong, May 1-5, 2001, pp. 275-284.

Rouff, "Formal Specification of User Interfaces", SIGHIC Bulletin, vol. 28, No. 3 (Jul. 1996) pp. 27-33.

Sandhu, Ravi S., et al., "Role-Based Access Control Models," IEEE Computer, vol. 29, No. 2, pp. 38-47 (1996).

Sandhu, Ravi S., et al., "The ARBAC97 Model for Role-Based Administration of Roles," ACM Transactions on Information and System Security vol. 2, No. 1, pp. 105-135 (Feb. 1999).

Sandhu, Ravi S., et al., "The RRA97 Model for Role-Based Administration of Role Hierarchies," ACSAC, pp. 39-49 (1998).

Shim, Won Bo, et al. "Implementing Web Access Control System for the Multiple Web Servers in the Same Domain Using RBAC Concept," IEEE, pp. 768-773 (2001).

Stephanidis, Constantine, et al., "Decision Making in Intelligent User Interfaces," IUI '97, Orlando, FL, US, ACM, pp. 195-202 (1997).

Stiemerling, Oliver, et al., "How to Make Software Softer—Designing Tailorable Applications," DIS '97, Amsterdam, The Netherlands, ACM, pp. 365-376 (1997).

Sundsted, Todd, "JNDI Overview, Part 1: An Introduction to Naming Services", JavaWorld, Jan. 2000, pp. 1-6, (downloaded from: www.javaworld.com/javaworld/jw-01-2000/jw-01-howto_p.html).

Supplementary European Search Report for EP 01 97 5484 dated Dec. 11, 2006 (2 pages).

Supplementary European Search Report for EP 02 7238740.0 dated Jun. 7, 2006 (3 pages).

Supplementary European Search Report for EP 02 773915.0 dated Oct. 12, 2006 (3 pages).

Symborski, Carl W., "Updating software and configuration data in a distributed communications network", IEEE Computer Networking Symposium, pp. 331-338 (1988).

Tanyi, Emmanuel, "Easy XML," www.winsite.com, pp. 1-6 (Mar. 2000).

Tzelepi, Sofia K., et al., "A Flexible Content and Context-Based Access Control Model for Multimedia Medical Image Database Systems," International Multimedia Conference, Proceedings of the 2001 Workshop on Multimedia and Security, Oct. 5, 2001, pp. 52-55.

USDatacenters . . . eBusiness, Business Wire, Apr. 4, 2001, p. 2079.

Visveswaran, Siva, "Dive into Connection Pooling with J2EE," reprinted from JavaWorld, 7 pages (Oct. 2000).

Yao, Walt, et al., "A Model of Oasis Role-Based Access Control and its Support for Active Security," ACM Workshop on Role Based Access Control, Proceedings of the Sixth ACM Symposium on Access Control Methods and Technologies, pp. 171-181 (2001).

Zhang, Zheng, et al., "Designing a Robust Namespace for Distributed File Services," Reliable Distributed System, Proceedings 20th IEEE Symposium on Oct. 28-31, 2001, pp. 162-171.

* cited by examiner

GROUPWARE PORTLETS FOR INTEGRATING A PORTAL WITH GROUPWARE SYSTEMS

CROSS REFERENCE TO RELATED APPLICATIONS

This application is related and cross-referenced to the following applications which are incorporated herein by reference:

U.S. patent application Ser. No. 11/522,240 entitled "PERSONAL MESSAGING APPLICATION PROGRAMMING INTERFACE FOR INTEGRATING AN APPLICATION WITH GROUPWARE SYSTEMS," by Jeffrey Thomas Sposetti, filed on Sep. 15, 2006.

U.S. patent application Ser. No. 11/473,571 entitled "SYSTEM AND METHOD FOR PROVIDING AN SPI BRIDGE FOR CONTENT MANAGEMENT SYSTEM," by Ryan Sean McVeigh et al., filed on Jun. 23, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to portals and groupware systems and in particular to integrating groupware functionality into a portal.

BACKGROUND OF THE INVENTION

A large portion of communication and information associated with an enterprise is often stored personal information management (PIM) and groupware systems in the form of emails, address books, task lists, and appointments, as well as other proprietary tools. At the same time, customized Customer Relations Management (CRM) systems are often needed in order to keep track of information about a specific customer and product base and to generally provide relevant business processes and scalability. Thus, organizations today must integrate groupware with more traditional information systems such as CRM, enterprise resource planning (ERP) and others. Unfortunately, the proprietary nature of groupware and PIM systems typically makes it difficult and expensive for an enterprise to integrate their data and information into other applications.

Many business organizations implement collaboration systems such as Microsoft Exchange® Server and Lotus Domino®. Thus, employees may use the email systems such as Microsoft Outlook provided by the Microsoft Exchange server in order to communicate, keep track of appointments, contacts, tasks, meetings and generally collaborate amongst each other when working on various projects. On the other hand, portals are rapidly becoming a business users primary workspace because they can bring the right information and applications to the right people at the right time. As such, portals can provide access to account management, opportunities and prospects maintained in a customer relations database and other areas of enterprise information and content. A significant part of the functionality provided by these separate systems often overlaps thereby creating inconsistencies and missing information which can impede performance and profitability of a company. For example, an employee may schedule an appointment with a customer via the portal but that appointment may not be created or updated in the collaboration server such as Microsoft Exchange. Alternatively, if an employee uses the groupware system to create the appointment, the database accessible via the portal may not be properly updated thereby causing missing information and inaccurate views of the customer.

The result is that in many enterprises frustrated users toggle between groupware and portal applications, duplicating work and data—often with dubious integrity or efficiency. What is needed is an improved system of integration, one that would facilitate interoperability between proprietary groupware systems and various enterprise portals. For example, it may be desirable for a portal server to gain access to personal contacts, email and appointments without having to know the complexities of proprietary groupware and PIM provider. It may also be desirable for such functionality to be achieved non-intensively, without causing disruption to the rest of the enterprise.

DETAILED DESCRIPTION

Figure 1:
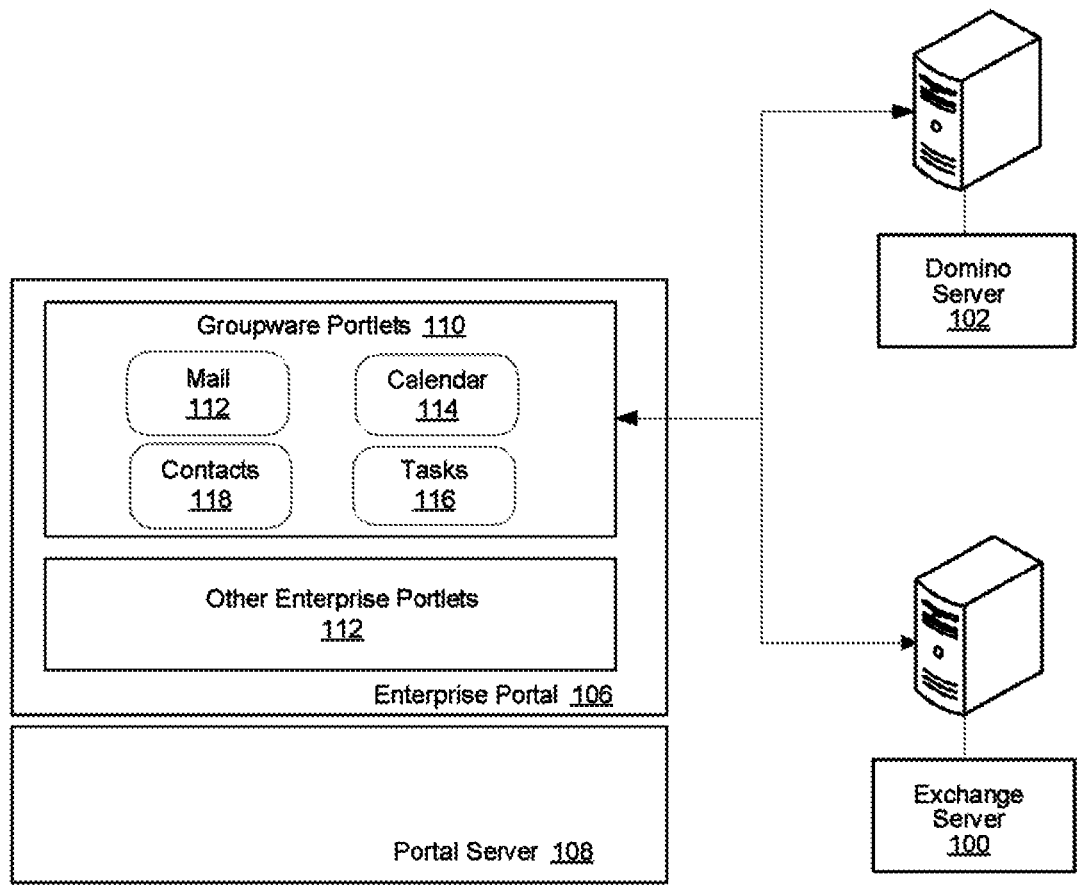
FIG. 1 is an exemplary illustration of groupware portlet user interface, in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with various embodiments of the invention, a set of groupware portlets is presented for adding collaboration and groupware functionality to an enterprise portal. The portlets can provide access to mail, appointments, contacts and tasks (as well as other features provided by the collaboration server) and bring that information into a business users portal thereby providing a familiar online work environment. The portlets can be pre-packaged components Java Server Pages (JSPs), Java classes and HTML that expose various features provided by collaboration servers.

In various embodiments, a personal messaging interface including various schemas and providers is implemented for connectivity between the portlets and the collaboration servers. This interface can include a set of schemas and providers in order to abstract the connectivity to the various collaboration servers into one application programming interface (API). The groupware portlets can use these schemas and providers so as to gain access to the groupware functionality provided by a collaboration server. In one embodiment, a schema can be thought of as an insulating layer between the portlet application and a specific provider implementation. For example, because the portlets use the groupware schema, rather than the Microsoft Exchange® implementation directly, the same portlets can be used with Lotus Domino® collaboration server by simply configuring them to switch the provider implementations. Schemas can consist of a hierarchy of abstract items and containers to resemble functionality provided by a collaboration server. Each item can contain one or more properties which can be implemented as key/value pairs. Containers can hold both items as well as other sub-containers. A root container may be obtained from the session which is instantiated with a particular service provider.

In one embodiment, specific item classes exist for the different entities in the schema. For example, the groupware schema may contain item classes for tasks, appointments and contacts while the messaging schema can contain classes for mail. The programming interface for manipulating the item class properties can be the same so as to simplify access for the portlets and to make them more transparent.

The provider can be an implementation of one or more schemas that makes that schema interact with a specific back-end system such as the collaboration server. For example, the Microsoft Exchange/MAPI provider can be an implementation of the groupware schema that connects to a Microsoft Exchange collaboration server and the Lotus Domino provider can be an implementation of the schema that connects to the Lotus Notes server. Since the providers use the low level interface to the collaboration server, much of the groupware functionality is exposed, while at the same time hiding the details and making the portlet appear as though it were a client of the collaboration server. In this manner, the groupware portlets can connect to several collaboration servers via the schema just by switching the provider implementation.

In various embodiments, two types of providers can be supported by the groupware portlets. First, message-centric collaboration can involve message transmission, storage and management and is commonly used in groupware systems such as Microsoft Exchange. Second, message-centric collaboration can involve message transmission, storage and management and is commonly used in groupware systems such as Lotus Domino. A same abstract interface can be used for both types of collaboration, as both may share many of the same required software patterns. Service providers can provide implementations for different collaboration backends.

FIG. 1 is an exemplary illustration of groupware portlet user interface, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, an enterprise may have a portal server 108 as well as various collaboration servers distributed throughout its environment. For example, some employees may be utilizing a Microsoft Exchange server 100 to take advantage of email, calendar and appointment services and a Lotus Domino server 102 which may provide similar features.

A set of groupware portlets 110 can be deployed to the enterprise portal 106 (alongside various other portlets 112) in order to allow employees to take advantages of the groupware functionality provided by the collaboration servers, all without leaving the portal. For example, the groupware portlets can enable employees to perform email 112 functions such as sending and receiving mail messages, calendar 114 functions such as scheduling of appointments and meetings, contacts 118 and personal address book management, personal task 116 list management functionality, as well as various other groupware functionality within the portlet. From the user's perspective, the groupware portlets can act similar to a Microsoft Outlook client or a Lotus client, providing a single user interface to allow access to the various features provided by the collaboration servers. Furthermore, the groupware portlets can provide administrators and developers with the ability to easily deploy user interface for accessing groupware functionality that is tightly integrated with the portal server so that no external web client, separate browser or login information is required from the end user.

In one embodiment, the groupware portlets can be deployed as a single configurable portlet or as a plurality of such portlets in order to increase portal flexibility. Thus, one enterprise may wish to deploy a single groupware portlet that enables all the groupware functionality provided by the various collaboration servers. In that case, the single groupware portlet instance can provide the user interface to the features like mail, calendar, meetings and tasks. Alternatively, multiple portlet instances can be deployed on the enterprise portal to separate the groupware features into several portlets. This can be made configurable by setting various options on the groupware portlets such that a separate groupware portlet is deployed for each of the features discussed above. These types of changes can be configurable by a system administrator, for example, without the need to edit any code by the developers. In this fashion, greater flexibility and customization is provided to the enterprise portal.

Figure 2:
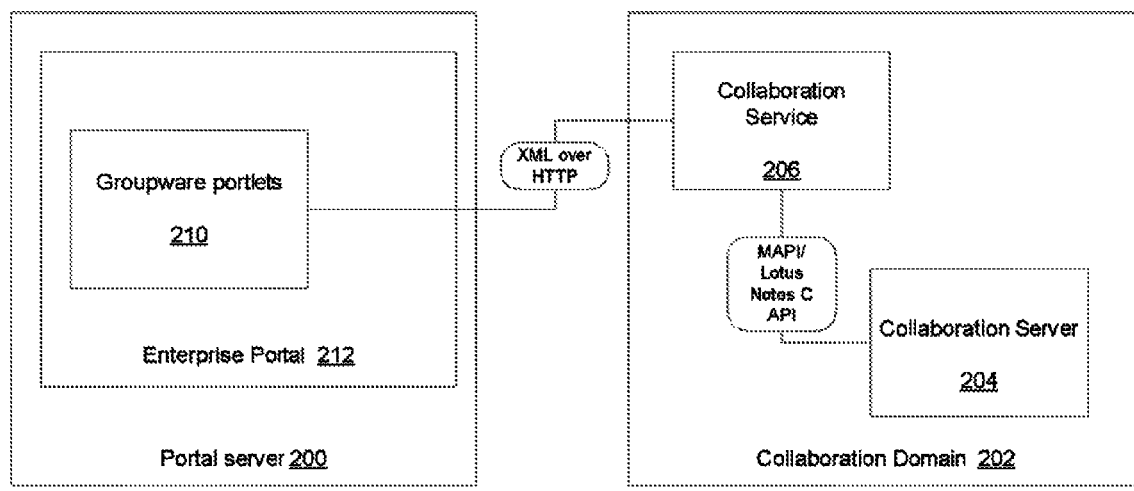
FIG. 2 is an illustration of a connectivity of the groupware portlets by utilizing web services, in accordance with various embodiments of the invention.

FIG. 2 is an illustration of a connectivity of the groupware portlets by utilizing web services, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, a groupware portlet 210 can be developed and deployed on the portal server 200 that provides an enterprise portal 212. An interface for accessing the collaboration server 204 can be integrated into the java based portlet by including the proper set of Java API libraries. The groupware portlet 210 can then connect to the collaboration server 204 (e.g. Microsoft Exchange server, Lotus Domino server) by first accessing a machine running the collaboration web service 206 via XML over HTTP/HTTPS. The collaboration service (e.g. Exchange service, Domino service) can convert requests into remote procedure calls in the specific interface (e.g. MAPI, Lotus Notes C API) of the collaboration server 204 within the domain 202.

Figure 3A:
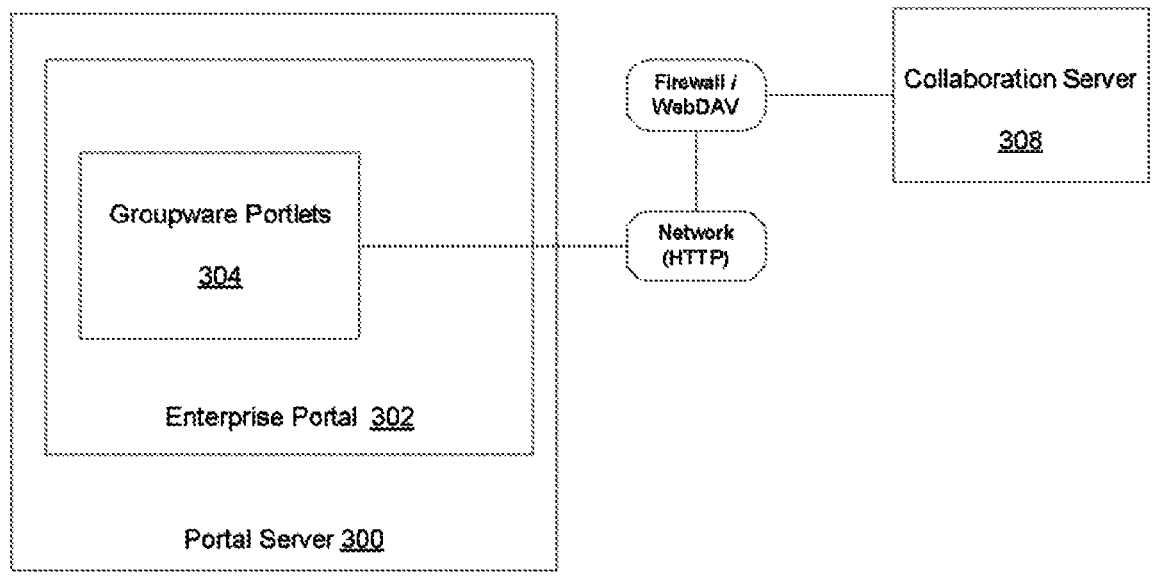
FIG. 3A is an exemplary illustration of an alternative connectivity of the groupware portlets via WebDAV, in accordance with various embodiments of the invention.

FIG. 3A is an illustration of an alternative connectivity of the groupware portlets via WebDAV, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, the groupware portlet 306 is deployed in the same manner as in FIG. 2 on the enterprise portal 302 running on an portal server 300. In this embodiment, there is no collaboration web service employed in order to integrate the portlets with the collaboration server 308. Instead, calls can be converted into WebDAV requests and submitted directly to the collaboration server over HTTP. WebDAV is a set of extensions to HTTP protocol (available from IETF group) which allows users to collaboratively edit and manage files on remote web servers. In response, the collaboration server can convert each request into a WebDAV response. By writing to the WebDAV protocol extensions the need for a separate web service computer can be eliminated and calls can be made directly to the collaboration server that provides the groupware functionality.

Figure 3B:
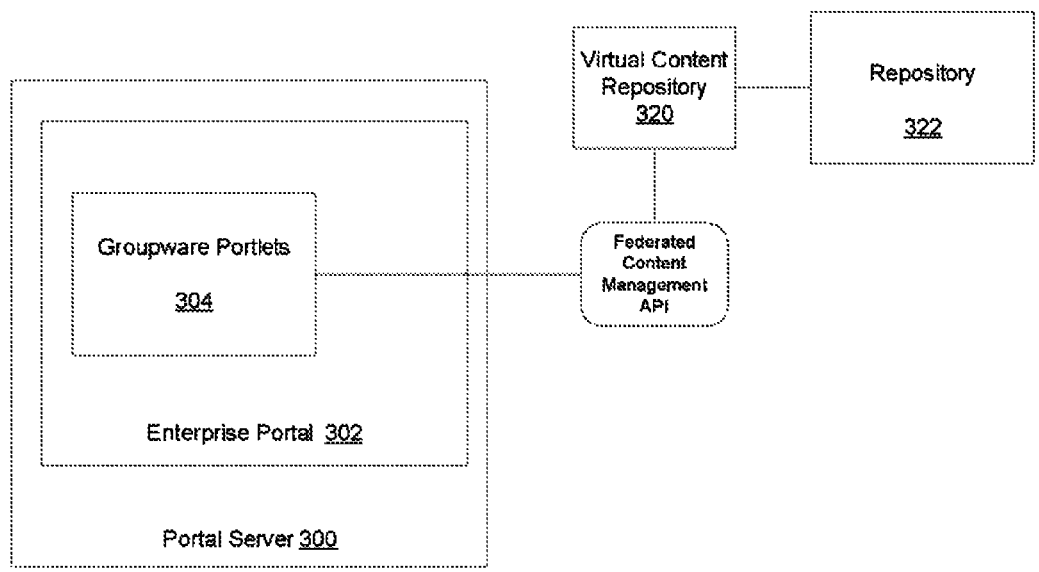
FIG. 3B is another exemplary illustration of an alternative connectivity of the groupware portlets via the Federated Content Management API, in accordance with various embodiments of the invention.

FIG. 3B is yet another an illustration of an alternative connectivity of the groupware portlets, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, the groupware portlet 306 is deployed in the same manner as in FIGS. 2 and 3A, on the enterprise portal 302 running on an portal server 300. In this embodiment however, the collaboration server is not the MS Exchange server or a Lotus Domino server, but is instead a virtual content repository 320 such as is available from BEA Systems, Inc. The virtual content repository can allow for the management and delivery of content from multiple, heterogeneous repositories. It can also provide a single federated content management application programming interface (API) for allowing applications to access the various content provided thereon. The virtual content repository 320 and the federated content management API are part of the BEA WebLogic Portal platform, available from BEA Systems, Inc., and are described in further detail in the United States Patent Application entitled "SYSTEM AND METHOD FOR PROVIDING AN SPI BRIDGE FOR CONTENT MANAGEMENT SYSTEM," by Ryan McVeigh et al. which is incorporated by reference herein.

As illustrated, the groupware portlets can use a provider to access the virtual content repository. The provider can call the federated content management API and can go through the virtualization layer (e.g. virtual content repository 320) to access content at the actual repository 322. A BEA content management provider can be written in order to allow the portlets to access the various content maintained in the repository. It should be noted that it is not necessary that the BEA virtual content repository or the BEA actual repository be used. Other such virtualization layers can be implemented and are well within the scope of the invention. It is also worth noting that the virtual repository can contain multiple actual repositories (not shown) similar to the BEA repository illustrated, for physically storing the content thereon.

Thus, an enterprise can be provided with a choice of implementations illustrated in FIGS. 2, 3A and 3B. Various factors may be considered when deciding which form of connectivity to implement. For example, specific interface calls to the collaboration server via a service may lessen the load on the collaboration server, but may require installation and configuration of an intermediary collaboration service machine. Similarly, connectivity via WebDAV can provide for an easier installation process but may create a heavier load on the server. Furthermore, it is possible that WebDAV may not be capable of completely exposing all of the groupware functionality provided by the collaboration server. In many cases, the optimal way to decide which mode of connectivity is better, is to test both with the application and evaluate the information technology (IT) requirements of the deployment against the results of that test.

Figure 4:
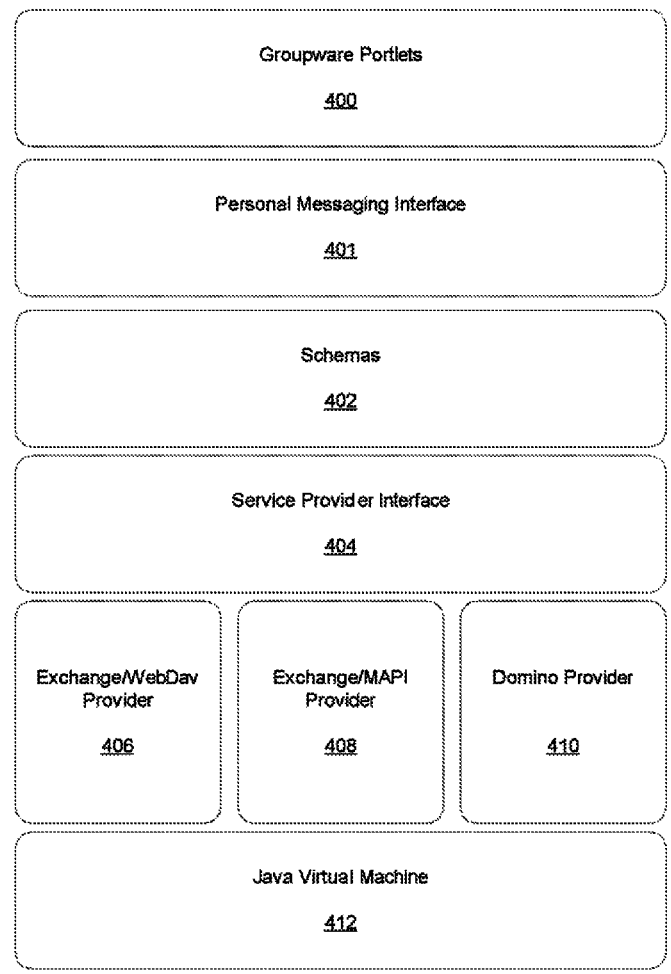
FIG. 4 is an exemplary illustration of the groupware portlets and the personal messaging interface, in accordance with various embodiments of the invention.

FIG. 4 is an illustration of the groupware portlets and the personal messaging interface, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, a groupware portlet 400 running on a JVM 412 can provide a user interface on top of connectivity exposed by a personal messaging interface 401. The portlets can use a schema 402 to access groupware functionality and can leverage a hierarchy or combinations of various schemas, such as the groupware schema, exchange schema or the domino schema. The schemas are backed by a provider implementation 406, 408, 410 which can be chosen when the programmer creates a session using the interface (or dynamically switched at runtime). The schema can access the provider via the service provider interface 404. Each provider can be an implementation of a schema that connects to the specific collaboration server that is associated with that provider. In other words, the providers can supply the backend collaboration connectivity by implementing one or more schemas and instantiating appropriate connections to a collaboration server such that the groupware portlets are allowed access to the groupware functionality provided thereon.

In one embodiment, a schema is a set of items and their properties, containers, enumerations and operations that can be performed on the items and containers. Schemas can extend other schemas, thereby supporting all the items in the super schema and possibly extending those items as well. The main schemas can be groupware, exchange and domino schemas. All can inherit from the messaging schema class. By the term inheritance, it is meant that the schema has the same item classes and container classes, plus additional ones. Providers can also often implement extended schemas for access to the higher level schemas that the extended schema implements. For example, the exchange schema can contain additional item classes that are Microsoft Exchange specific and thus not available in the general groupware schema. However, because the exchange schema extends the groupware schema: the exchange provider still can fully support the groupware schema. Similarly, the Domino schema may have classes which are Lotus Domino specific and not available in the general groupware schema. These classes can be supported by the Lotus Domino provider because of the extended schemas.

Figure 5:
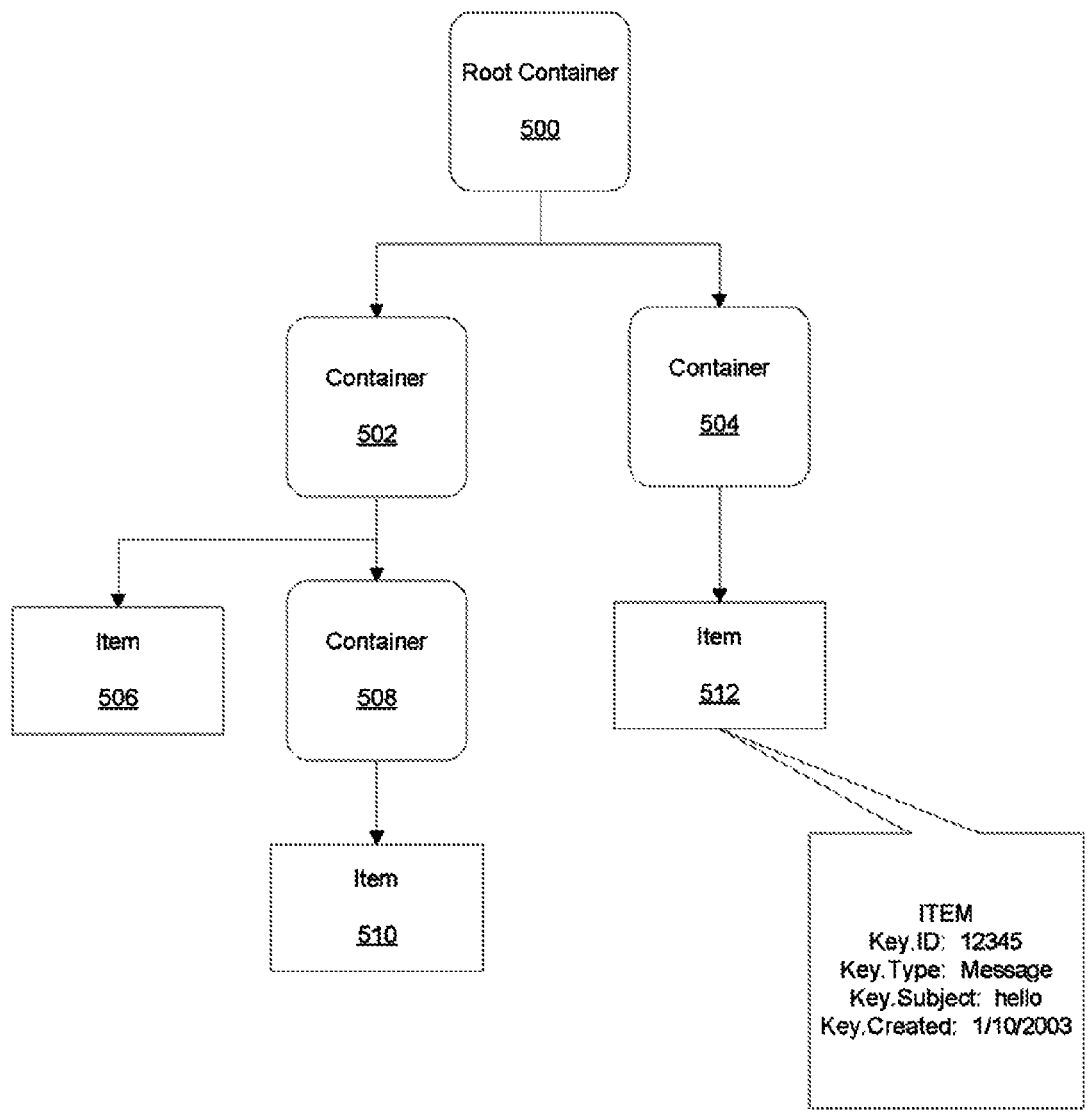
FIG. 5 is an exemplary illustration of the hierarchy of items and containers that can make up a schema in the personal messaging interface, in accordance with various embodiments of the invention.

FIG. 5 is an illustration of the hierarchy of items and containers that can make up a schema, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, a schema can consist of various items 506, 510, 512 and containers 500, 502, 504, 508. A container can be a specialized type of item that can hold other items. Each item can have a set of properties, which are key/value pairs stored on the items. These items, while concrete, typically represent different things depending on the provider in use. For example, an item in a groupware provider could be a contact or an appointment, whine an item in a messaging provider could be a mail message.

In one embodiment, message-centric collaboration can be done by accessing items (in this case messages 512) in a user's mail store, and calling specific methods on these items. For example, a groupware portlet can call a method to send a message, assign a task, add a new contact, schedule an appointment, move an email message to another folder and so on, all without having to know the complexities of the interface of the underlying collaboration system. Interaction centric collaboration, on the other hand, can involve getting and adding items to specialized containers and registering event handlers to be notified of item changes. Thus, by using the classes in the groupware schema, the developer can be insulated from needing to know the specific storage structure or APIs of the collaboration system when accessing mail, calendar, contacts, tasks and other objects.

In one embodiment, the classes in the groupware schema can access the collaboration server by first contacting an intermediary service machine that runs a collaboration service. For example, the exchange service can provide connectivity to Microsoft Exchange as an intermediary between Java and the MAPI interface subsystem. Similarly, the Lotus Domino service can act as the intermediary between Java and the Lotus Notes C API interface subsystem.

In one embodiment, it is preferable that HTTP or HTTPS traffic is able to pass between the Java application machine running the personal messaging interface and the collaboration server. This could be for example a port that is chosen and configured by a system administrator. The link between the machines can cover a wide area network to traverse longer distances. It may be preferable, however, to place the service intermediary machine as close to the collaboration server as possible, in order to maximize performance.

In one embodiment, the developer can use the item and container classes (or the classes of other schemas) during the building process of an application such as the groupware portlet. In cases when the portlet needs to refer to a message or some other entity on the backend collaboration server, the developer can simply include code (e.g. method calls) referring to the item and container classes of the personal messaging interface. This way the developer is shielded from having to learn the specific implementation details of the backend system. Once the portlet is finished, it can be deployed and its classes instantiated. The provider can then handle the implementation of the item and container classes, as well as any extended schemas such that a connection is created to the backend system and the portlet is enabled to perform various actions on objects and entities in that backend system. In this manner, the implemented item and container classes can be thought of as java wrapper objects for the connection to entities in the backend collaboration server. In one embodiment, a provider can implement a stub in order to gain access to the backend collaboration server. A stub can be a program module that represents a remote entity and it can be used to invoke methods on that remote entity. For example, an appointment residing on an Microsoft Exchange server can be accessed via the stub. Other such objects can include meetings, contacts, emails, attachments, folders, as well as any other units that are provided by the collaboration server. Thus, a stub is capable of making a set of core calls to the backend system. The provider can implement these core calls as well as support one or more schemas thereby providing access for the groupware portlets to the content and services on a specific collaboration server.

Since the providers can be responsible for creating and maintaining connections, a user need only switch the provider in order to grant the groupware portlets an ability to function with a different collaboration server. For example this can be done by the developer, specifying at the beginning of the session which collaboration server needs to interact with the portlet. Then an appropriate provider that is associated with that collaboration server can be used to implement connections to that server. The providers can also be switched or added at runtime without the need to reorganize the enterprise or redeploy the portlet. Thus, multiple instances and connections can be running at the same time, allowing the portlet to connect to different collaboration servers simultaneously.

One provider that can be implemented is capable of communicating with the collaboration server directly by writing to the WebDAV protocol, thereby accessing its functionality. Another provider can communicate with an intermediary collaboration service machine in native Java where the intermediary service can then convert each call into that collaboration server's specific interface calls (e.g. MAPI Lotus Notes C API, etc.). The intermediary service machine can allow for more extensive functionality to be retrieved from the collaboration server because communications arrive at that server in its specific API. However, this may involve a separate service being deployed on the network thereby consuming more resources. In cases where the collaboration server does not support WebDAV protocol this type of provider may be preferable. In any case, the user can be provided the ability to configure this feature.

Figure 6:
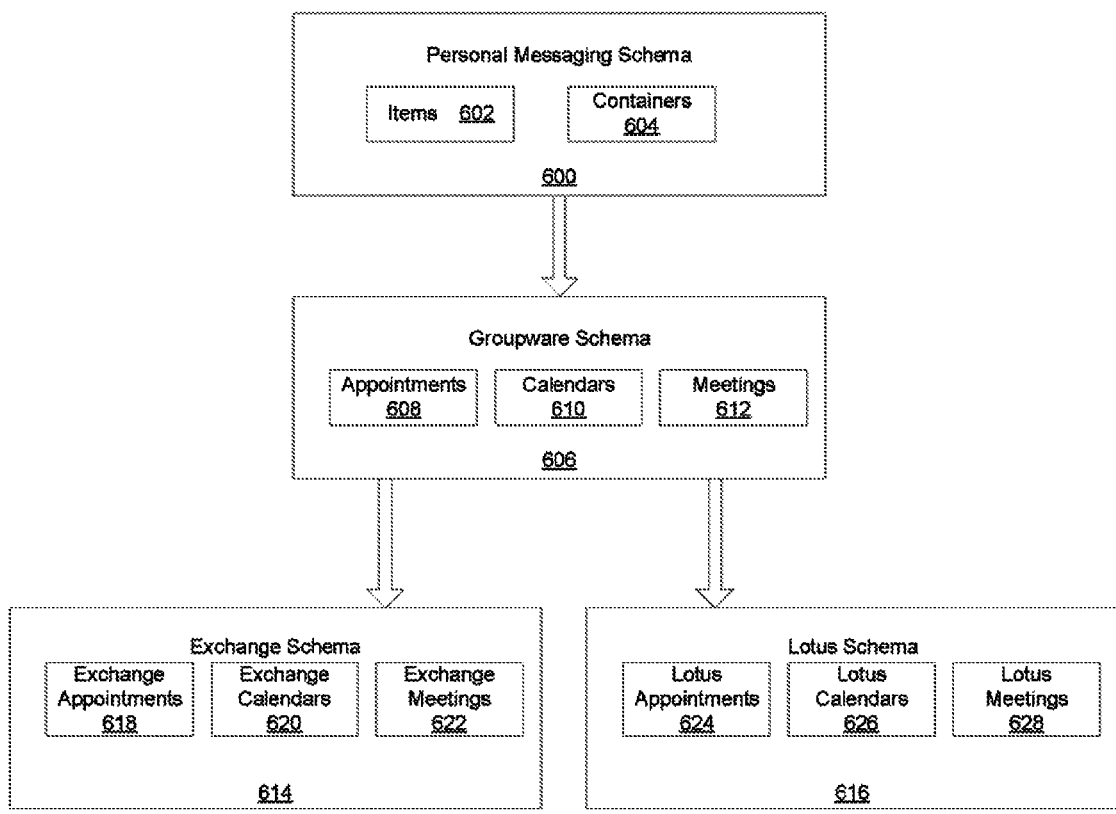
FIG. 6 is an exemplary illustration of a sample hierarchy of schemas as used in the personal messaging interface, in accordance with various embodiments of the invention.

FIG. 6 illustrates a sample hierarchy of schemas as used in the personal messaging interface, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, the personal messaging interface can include a personal messaging schema 600, a groupware schema 606, an exchange schema 614 and a lotus schema 616. These schemas can be hierarchically related and inherit from one another. For example the groupware schema 606 can extend the personal messaging schema 600 and be extended by the exchange 614 and the lotus 616 schemas.

The personal messaging schema can implement item classes 602 and container classes 604 which contain various items. In the extended groupware schema, these items and containers can be made into groupware entities classes (i.e. functionality provided by most collaboration servers) such as appointments 608, calendars 610 and meetings 612. Other such entities are not shown in the figure for purposes of simplicity, but they may include, mail messages, attachments, tasks, contacts as well as other types of entities commonly available in groupware systems. Via the use of these groupware entities classes, the groupware schema can implement functionality that is more specific than mere items and containers, (e.g. functions like sending messages, scheduling an appointment, etc.) but still span across multiple groupware providers.

On the other hands one specific collaboration server may have functionality that is not common to other such servers, and the developer may wish to access this functionality as well. In this scenario, the developer can implement the collaboration server-specific schemas, such as the exchange schema 614 and the lotus schema 616. As an example, the exchange schema can further define classes which are more specific to Microsoft Exchange type of functionality, such as exchange appointments 618, exchange calendars 620 and exchange meetings 622. Similarly, the lotus schema can implement classes specific to Lotus Domino functionality such as lotus appointments 624, lotus calendars 626 and lotus meetings 628.

A developer can write code at any level of the hierarchy. For example, some method calls may be made at a high level, implementing the personal messaging schema and may not employ specific groupware functionality. On the other hand, it may also be desirable to access methods specific to Microsoft Exchange collaboration server or the Lotus Domino collaboration server. The developer is provided with such options and the portlets can be made to interfunction with all such backend systems. The groupware portlets can further provide a user interface to allow end users to access functionality at any level of the schema hierarchy. For example, a groupware portlet can implement a high level user interface that corresponds to the groupware schema where the high level user interface provides access to functionality that is common among the various collaboration systems. On the other hand, groupware portlets can also provide more specific user interfaces to match the precise functionality provided by a single collaboration server (e.g. Microsoft Exchange server). This sort of abstraction hierarchy can be built into the groupware portlets so as to enable various types of access to groupware functionality.

Figure 7:
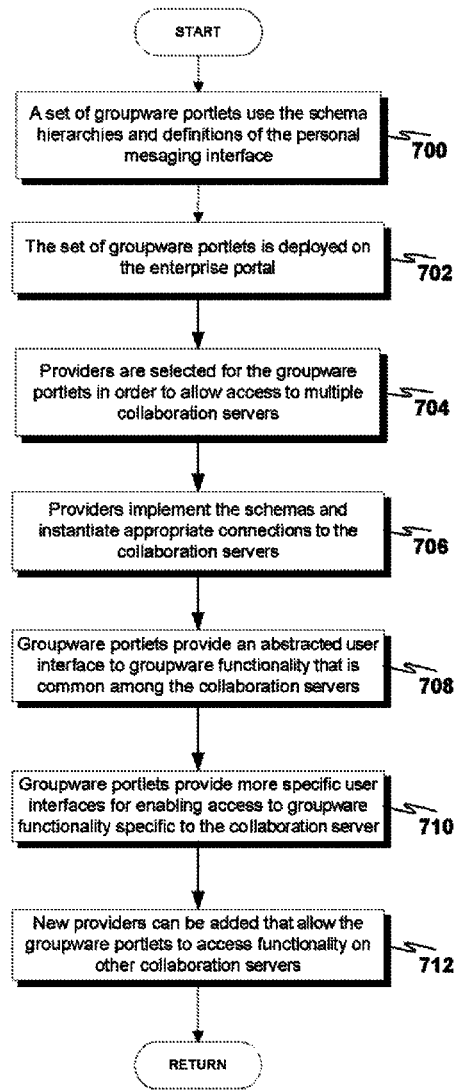
FIG. 7 is an exemplary flowchart illustration of groupware portlet functionality, in accordance with various embodiments.

FIG. 7 is an exemplary flowchart illustration of groupware portlet functionality, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 700, the set of groupware portlets can be created that use the personal messaging interface to enable and abstract connectivity to the backend collaboration system. For example, the groupware portlets can use the schema definitions and the various schema hierarchies as previously described in order to call methods to access the groupware functionality. The schema hierarchies can enable groupware access at high levels such items and containers, lower levels such as messages, appointments, tasks, as well as even lower levels such as the specific functionality provided by the Microsoft Exchange server or the Lotus Domino server.

As illustrated in step 702, this set of groupware portlets can be deployed to the enterprise portal server to provide the user interface layer. The providers can be selected to enable the groupware portlets to connect to different groupware servers, as illustrated in step 704. Once selected, the providers can take care of instantiating the appropriate connections to the backend servers, as illustrated in step 706. Since the providers are implementations of the schema classes, they enable the groupware portlets that use the schema to connect to the collaboration servers. For example, the exchange provider can allow the groupware portlet to access the exchange functionality on an exchange server via the schema definitions.

The groupware portlets can provide a user interface to the connectivity enabled by the schemas and providers. As illustrated in step 708, the groupware portlet can provide an abstract interface to the functionality provided across multiple groupware servers. For example, a general user interface can be provided to send a message or to create a contact, and so on. Furthermore, as illustrated in step 710, the groupware portlets can also provide an ability for the abstract interface to branch off into a more specific UI that more precisely matches the functionality provided by a specific collaboration server. For example, a Lotus Domino server can provide certain specific features or options that are not available on other collaboration servers. The schema hierarchy can allow groupware portlets to access this functionality by implementing the appropriate providers. Furthermore, groupware portlets can provide the specific user interfaces which branch off from the higher level interfaces, in order to give end users access to the specific Lotus Domino features. This type of system can provide for more flexibility white still enabling a layer of abstraction among the functionality provided by the various groupware collaboration servers.

In step 712, new providers can be added to the deployed groupware portlets such that the portlets are then enabled to access the groupware functionality provided by the collaboration servers that are associated with these new providers. The providers can be added dynamically at runtime without the need for further coding by developers. These providers can then take care of creating the new connections to the collaboration servers and implementing the schemes used by the portlet such that the portlet can obtain access to the new collaboration servers. In this manner, portlets need not be re-coded and redeployed in order to achieve integration with new groupware providers.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, Rams, EPROM's, EPRO'Ms, Drams, Rams, flash memory of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can also include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A system for integrating groupware functionality into a portal, comprising:
   one or more microprocessors;
   a groupware portlet deployable on the portal, wherein the groupware portlet executes on the one or more microprocessors, and allows one or more users to access groupware functionality on the groupware portlet;
   a plurality of collaboration servers, wherein each collaboration server provides the groupware functionality for the groupware portlet;
   an application programming interface that includes a schema and one or more provider components,
   wherein the schema defines the groupware functionality provided by the plurality of collaboration servers used at the groupware portlet,
   wherein a particular one of the one or more provider components is used by the schema to interact with one of the plurality of collaboration servers to allow the groupware portlet to access the groupware functionality provided by the one of the plurality of collaboration servers, and
   wherein each collaboration server is associated with one of the one or more provider components, and wherein each provider component is a specific implementation of the schema for one of the plurality of collaboration servers, and wherein the groupware portlet connects to any one of the plurality of collaboration servers via the schema by using one of the one or more provider components; and
   wherein the groupware portlet switches from a first collaboration server of the plurality of collaboration servers to a second collaboration server of the plurality of collaboration servers for groupware functionality by replacing a first provider component associated with the first collaboration server, with a second provider component associated with the second collaboration server.

2. The system according to claim 1, wherein the schema includes an item class for representing entities on one of the plurality of collaboration servers and a container class for storing one or more items or other containers.

3. The system according to claim 2,
wherein the particular one of the one or more provider components implements a stub to create a connection to the one of the plurality of collaboration servers and to map method calls from the groupware portlet as defined by the schema to the groupware functionality provided by the one of the plurality of collaboration servers.

4. The system according to claim 1, wherein a new schema is implemented to extend the schema, and wherein the new schema exposes method calls that are specific to the groupware functionality in a particular collaboration server.

5. The system according to claim 4, wherein the application programming interface is further adapted to allow the one or more users to access the groupware functionality provided by the particular collaboration server as exposed by the new schema.

6. The system according to claim 1, wherein the groupware portlet makes WebDAV calls directly to one of the plurality of collaboration servers in order to access the groupware functionality.

7. The system according to claim 1, further comprising:
an intermediary collaboration service computer that receives HTTP calls from the groupware portlet and translates the HTTP calls to specific interface calls on one of the plurality of collaboration servers.

8. The system according to claim 1, wherein:
the groupware portlet connects to a virtual content repository adapted to manage and deliver content from multiple, heterogeneous repositories through a federated content management application programming interface.

9. The system according to claim 1, wherein:
the application programming interface is a personal messaging interface that is associated with a plurality of schemas, wherein the plurality of schemas are hierarchically related in a schema hierarchy, and wherein a developer can write code at any level of the schema hierarchy to allow the one or more users to access functionality at different levels of the schema hierarchy.

10. The system of claim 1, wherein the schema defines the groupware functionality using a hierarchy of items that includes one or more properties that are implemented as key-value pairs.

11. A computer implemented method for integrating groupware functionality into a portal, the method comprising:
deploying a groupware portlet on the portal, wherein the groupware portlet executes on one or more microprocessors and allows one or more users to access groupware functionality using the groupware portlet;
providing a plurality of collaboration servers, wherein each collaboration server provides the groupware functionality for the groupware portlet;
providing an application programming interface that includes a schema and one or more provider components;
defining, via the application programming interface, the groupware functionality using the schema, wherein a particular one or the one or more provider components is used by the schema to interact with one of the plurality of collaboration servers to allow the groupware portlet to access the groupware functionality provided by the one of the plurality of collaboration servers;
associating each collaboration server with one of the one or more provider components, and wherein each provider component is a specific implementation of the schema for one of the plurality of collaboration servers;
connecting the groupware portlet to any one of the plurality of collaboration servers via the schema by using one of the one or more provider components, wherein the groupware portlet switches from a first collaboration server of the plurality of collaboration servers to a second collaboration server of the plurality of collaboration servers for groupware functionality by replacing a first provider component associated with the first collaboration server, with a second provider component associated with the second collaboration server; and
allowing, via the application programming interface, the groupware portlet to access the groupware functionality provided by the second collaboration server.

12. The method according to claim 11, further comprising:
including in the schema an item class for representing entities on one of the plurality of collaboration servers and a container class for storing one or more items or other containers.

13. The method according to claim 11, further comprising:
implementing, via the particular one of the one or more provider components, a stub to create a connection to the one of the plurality of collaboration servers and to map method calls from the groupware portlet as defined by the schema to the groupware functionality provided by the one of the plurality of collaboration servers.

14. The method according to claim 11 further comprising:
implementing a new schema to extend the schema, and wherein the new schema exposes method calls that are specific to the groupware functionality in a particular collaboration server.

15. The method according to claim 14 further comprising:
adapting the application programming interface to allow the one or more users to access the groupware functionality provided by the particular collaboration server as exposed by the new schema.

16. The method according to claim 11 further comprising:
making WebDAV calls directly to one of the plurality of collaboration servers in order to access the groupware functionality.

17. The method according to claim 11, further comprising:
receiving HTTP calls from the groupware portlet, at an intermediary collaboration service computer which translate the HTTP calls to specific interface calls on one of the plurality of collaboration servers.

18. A non-transitory computer readable storage medium having instructions stored thereon which when executed by one or more microprocessors cause a system to:
deploy a groupware portlet on a portal, wherein the groupware portlet allows one or more users to access groupware functionality using the groupware portlet;
provide a plurality of collaboration servers, wherein each collaboration server provides the groupware functionality for the groupware portlet;
provide an application programming interface that includes a schema and one or more provider components;
define, via the application programming interface, the groupware functionality using the schema, wherein a particular one or the one or more provider components is used by the schema to interact with one of the plurality of collaboration servers to allow the groupware portlet to access the groupware functionality provided by the one of the plurality of collaboration servers;
associate each collaboration server with one of the one or more provider components, and wherein each provider component is a specific implementation of the schema for one of the plurality of collaboration servers;

connect the groupware portlet to any one of the plurality of collaboration servers via the schema by using one of the one or more provider components, wherein the groupware portlet switches from a first collaboration server of the plurality of collaboration servers to a second collaboration server of the plurality of collaboration servers for groupware functionality by replacing a first provider component associated with the first collaboration server, with a second provider component associated with the second collaboration server; and allow, via the application programming interface, the groupware portlet to access the groupware functionality provided by the second collaboration server.

* * * * *

UNITED STATES PATENT AND TRADEMARK OFFICE
CERTIFICATE OF CORRECTION

PATENT NO. : 8,463,852 B2  
APPLICATION NO. : 11/539492  
DATED : June 11, 2013  
INVENTOR(S) : Sposetti et al.

Page 1 of 1

It is certified that error appears in the above-identified patent and that said Letters Patent is hereby corrected as shown below:

On Title page 3, column 2, under U.S. Patent Documents, line 78, delete "Auvenshire" and insert -- Auvenshine --, therefor.

On Title page 4, column 2, under Other Publications, line 52, delete "CONVINGTON" and insert -- COVINGTON --, therefor.

In the Specification

In column 1, line 61, delete "users" and insert -- user's --, therefor.

In column 3, line 22, delete "users" and insert -- user's --, therefor.

In column 7, line 30, delete "schema:" and insert -- schema, --, therefor.

In column 7, line 57, delete "whine" and insert -- while --, therefor.

In column 8, line 58, delete "example" and insert -- example, --, therefor.

In column 9, line 52, delete "hands" and insert -- hand --, therefor.

In column 11, line 1, delete "white" and insert -- while --, therefor.

In column 11, line 35, delete "EPRO'Ms," and insert -- EEPROM's, --, therefor.

In column 11, line 35, after "Drams," delete "Rams,".

In the Claims

In column 13, line 59, in Claim 11, delete "one or the" and insert -- one of the --, therefor.

Signed and Sealed this  
Fifteenth Day of October, 2013

Teresa Stanek Rea  
*Deputy Director of the United States Patent and Trademark Office*